United States Patent
Watanabe

(10) Patent No.: US 7,496,859 B2
(45) Date of Patent: Feb. 24, 2009

(54) FOLDER ICON DISPLAY CONTROL APPARATUS

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 717 days.

(21) Appl. No.: 10/361,824

(22) Filed: Feb. 11, 2003

(65) Prior Publication Data
US 2003/0156140 A1 Aug. 21, 2003

(30) Foreign Application Priority Data
Feb. 20, 2002 (JP) ............................. 2002-043250

(51) Int. Cl.
*G06F 3/00* (2006.01)
(52) U.S. Cl. .................................................. 715/838
(58) Field of Classification Search ................ 715/838, 715/804, 719, 977, 836, 88
See application file for complete search history.

(56) References Cited

U.S. PATENT DOCUMENTS

| | | | | |
|---|---|---|---|---|
| 4,904,990 | A * | 2/1990 | Takeda et al. ................ | 345/213 |
| 5,479,602 | A * | 12/1995 | Baecker et al. .............. | 715/838 |
| 5,831,617 | A * | 11/1998 | Bhukhanwala .............. | 715/839 |
| 5,903,309 | A * | 5/1999 | Anderson ............... | 348/333.02 |
| 6,466,237 | B1 * | 10/2002 | Miyao et al. ................ | 715/838 |
| 6,496,206 | B1 * | 12/2002 | Mernyk et al. .............. | 715/835 |
| 2001/0056434 | A1 * | 12/2001 | Kaplan et al. ............ | 707/104.1 |
| 2003/0076322 | A1 * | 4/2003 | Ouzts et al. .................. | 345/440 |
| 2005/0154754 | A1 * | 7/2005 | Sheldon et al. ............. | 707/102 |

FOREIGN PATENT DOCUMENTS

| | | |
|---|---|---|
| JP | 7-28842 A | 1/1995 |
| JP | 7-225768 A | 8/1995 |
| JP | 10-187855 | 7/1998 |
| JP | 2000-82127 A | 3/2000 |
| JP | 2000-105772 A | 4/2000 |
| JP | 2000-172247 A | 6/2000 |
| JP | 2001-109877 A | 4/2001 |
| JP | 2001-326885 A | 11/2001 |

OTHER PUBLICATIONS

"Explanation of All Features of New Age OS Well Understood 'Windos XP'"; Ayako Hattori, Nikkei Pasocon, Nikkei BP, Inc., Oct. 15, 2001, No. 395, p. 86-109.
Ascii, "Trouble Shooting for Windows XP" vol. 25, No. 12, pp. 183, Dec. 2001.
ASCII, "Trouble Shooting for Windows XP" vol. 25, No. 12, pp. 183, Dec. 2001 (previously cited in the IDS filed Sep. 8, 2008).

* cited by examiner

*Primary Examiner*—Stephen Hong
*Assistant Examiner*—Samir Termanini
(74) *Attorney, Agent, or Firm*—Birch, Stewart, Kolasch & Birch, LLP

(57) ABSTRACT

Folder icon images are generated using image files contained in a folder. The folder icon images generated are displayed on a folder icon in the manner of a slide show in order in accordance with a fixed cycle. Images represented by the image files contained in the folder may thus be ascertained without opening the folder.

4 Claims, 11 Drawing Sheets

*Fig. 2*

| FOLDER NAME | FILE NAME (DATE AND TIME OF PHOTOGRAPHY) |
|---|---|
| AUTOMOBILES | IMG00001. JPG (OCTOBER 10, 2001   11:20) |
| | IMG00002. JPG (OCTOBER 10, 2001   11:50) |
| | IMG00003. JPG (OCTOBER 10, 2001   13:40) |
| ANIMALS | IMG00055. JPG (NOVEMBER 23, 2001   10:30) |
| | IMG00056. JPG (NOVEMBER 23, 2001   11:10) |
| | IMG00057. JPG (NOVEMBER 23, 2001   15:55) |
| SPORTS | IMG00201. JPG (DECEMBER 10, 2001   13:10) |
| | IMG00202. JPG (DECEMBER 10, 2001   13:20) |
| | IMG00203. JPG (DECEMBER 10, 2001   14:20) |
| WEDDING CEREMONY | IMG00355. JPG (JANUARY 27, 2002   12:10) |
| | IMG00356. JPG (JANUARY 27, 2002   12:30) |
| | IMG00357. JPG (JANUARY 27, 2002   12:40) |
| | IMG00358. JPG (JANUARY 27, 2002   12:50) |

DESKTOP

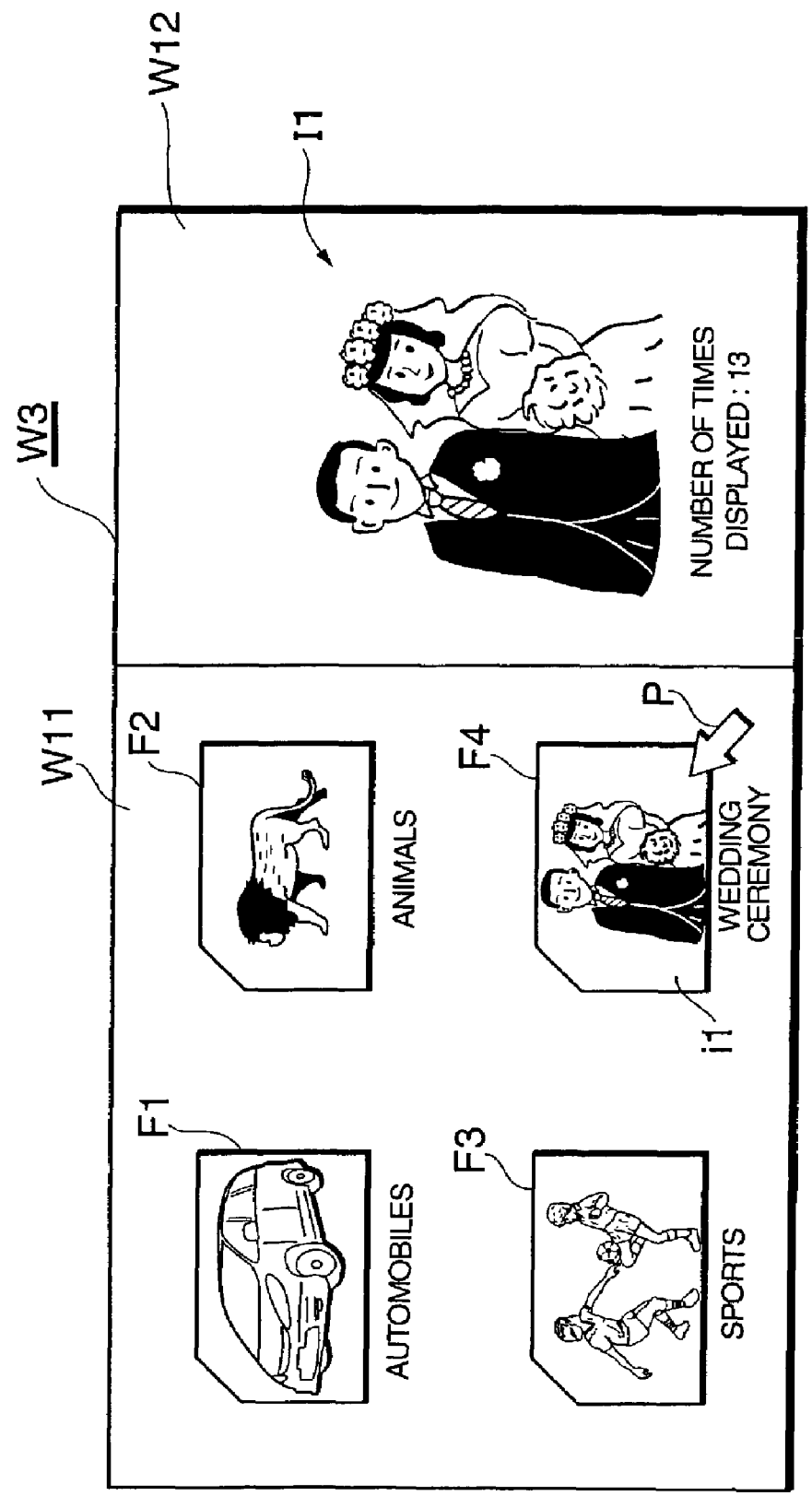

FOLDER ICON DISPLAY CONTROL APPARATUS

BACKGROUND OF THE INVENTION

1. Field of the Invention

This invention relates to an apparatus for controlling the display of folder icons.

2. Description of the Related Art

Figures referred to as icons are displayed on the display screen of a display unit, which has been connected to a personal computer, in order to identify software and files, etc., that have been stored on a hard disk of the personal computer. In the case of a folder containing image files, the icon of the folder is displayed. Clicking on the folder icon opens the folder and displays the icons of the image files contained in the folder. Clicking on the icon of a displayed image file opens the image file identified by the icon of the image file clicked. The image represented by the opened image file is displayed.

Thus, when a folder contains an image file, in many cases the image represented by the image file cannot be viewed unless the folder is opened and then the image file.

SUMMARY OF THE INVENTION

Accordingly, an object of the present invention is to so arrange it that the content of a plurality of frames of images represented by image files of a plurality of frames contained in a folder can be ascertained without opening the folder.

According to the present invention, the foregoing object is attained by providing an apparatus for controlling display of folder icons, comprising an icon image data generating device (icon image data generating means) for generating icon image data of a plurality of frames of icon images from original image data of a plurality of frames of original images represented by a plurality of image files contained in a folder, the plurality of frames of icon images corresponding to respective ones of the plurality of frames of original images and having such a size that the icon images are displayed on an icon of the folder; and a first display control device (first display control means) for controlling a display device in such a manner that a plurality of frames of icon images represented by the icon image data generated by the icon image data generating unit will be displayed in order (in the form of a so-called "slide show") on the icon of the folder.

The present invention may be adapted so as to provide a control method suited to the above-described folder icon display control apparatus. Specifically, the method comprises the steps of generating icon image data of a plurality of frames of icon images from original image data of a plurality of frames of original images represented by a plurality of image files contained in a folder, the plurality of frames of icon images corresponding to respective ones of the plurality of frames of original images and having such a size that the icon images are displayed on an icon of the folder; and controlling a display device in such a manner that a plurality of frames of icon images represented by the icon image data generated will be displayed in order on the icon of the folder.

A program for implementing the above method and a recording medium on which the program has been stored can also be provided.

In accordance with the present invention, icon image data representing a plurality of frames of icon images having such a size that the icon images are displayed on an icon of a folder and corresponding to respective ones of a plurality of frames of original images is generated. The plurality of frames of the icon images represented by the generated icon image data are displayed in order on the folder icon.

Since the icon images corresponding to the original images displayed by the image files contained in a folder identified by a folder icon are displayed as a slide show on the folder icon, the content of the image files contained in the folder can be ascertained by viewing the icon images.

For example, the icon images are displayed on the folder icon in accordance with the order of the dates and times of photography of the corresponding original images, the order of the file names of the images files, or in random order.

The apparatus may further comprise a command device (command means) for applying an original-image display command, and a second display control device (second display control means) for controlling the display device so as to display an original image corresponding to an icon image, which is being displayed on the icon of the folder, when an original-image display command has been applied by the command device.

Since the original image is thus displayed, the details of the image can be ascertained.

The apparatus may further comprise a counting device (counting means) for counting the number of times the original image is displayed. In such case, the first control device is capable of deciding the order of display of the icon images based upon the count obtained from the counting device.

Thus, the icon images are displayed on the folder icon in decreasing order of the number of times they have been displayed. As a result, the fact that an image file representing a desired image is contained in a folder specified by the folder icon can be ascertained quickly.

It may be so arranged that the value of the count is displayed. It may be so arranged that the value of the count is displayed in association with an icon image or in association with an original image displayed in the manner described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 illustrates part of a directory;

FIG. 11 shows an example of a window displayed on the display screen of the display unit according to this modification.

DESCRIPTION OF THE PREFERRED EMBODIMENT

A preferred embodiment of the present invention will now be described in detail with reference to the drawings.

Figure 1:
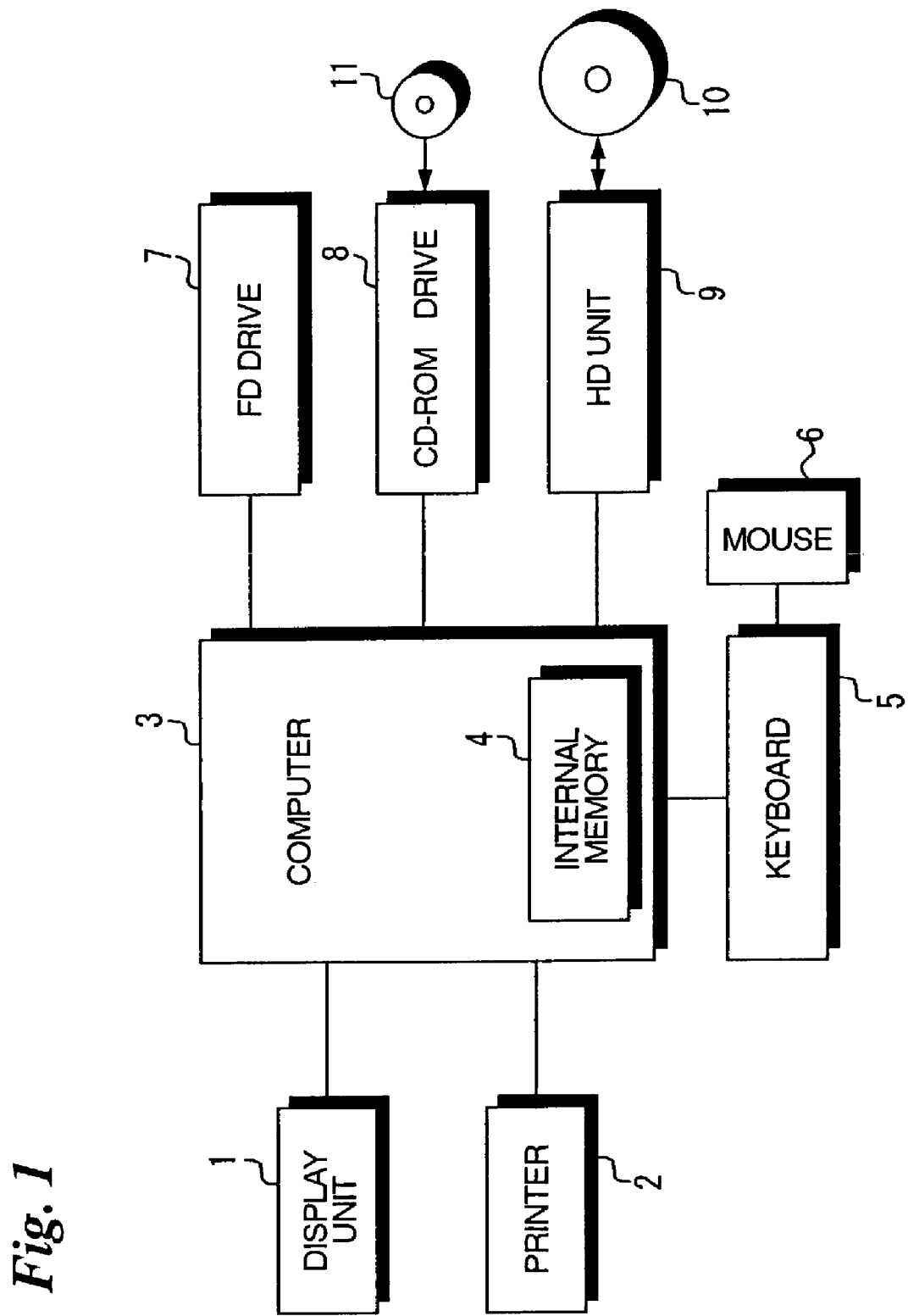
FIG. 1 is a block diagram illustrating the electrical configuration of a computer system.

FIG. 1 is a block diagram illustrating the configuration of a computer system according to a preferred embodiment of the present invention.

The computer system includes a computer 3 to which a display unit 1, printer 2 and keyboard 5 are connected. A mouse 6 is connected to the computer 3 via a keyboard 5. A floppy disk (FD) drive 7, a compact disc-read only memory (CD-ROM) drive 8 and a hard disk (HD) unit 9 are connected to the computer 3. The FD drive 7 writes data to and reads data from a floppy disk (not shown). The CD-ROM drive 8 reads data and programs, etc., out of a CD-ROM 11. The HD unit 9 writes data (files) to and reads data from hard disk 10. The computer 3 includes an internal memory 4.

The system operates in the manner described later by reading a program stored on the CD-ROM 11 out of the CD-ROM 11 by the CD-ROM drive 8.

FIG. 2 illustrates part of the hierarchical directory of the hark disk 10.

In this embodiment, folders having folder names such as "AUTOMOBILES", "ANIMALS", "SPORTS" and "WEDDING CEREMONY" have been stored on the hark disk 10 in a hierarchy under a directory referred to as the "DESKTOP". Each of these folders contains still-image files (though moving-image files and voice files may also be included). For example, the folder having the file name "AUTOMOBILES" contains image files having file names IMG00001.JPG to IMG00003.JPG. Similarly, the folder having the file name "WEDDING CEREMONY" contains image files having file names IMG00355.JPG to IMG00358.JPG. The folders having the other folder names contain image files in similar fashion.

Date and time (date and time of photography) when each image file was obtained also is displayed in FIG. 2. The data indicative of the photography date and time has been recorded in the header area of the image file.

Figure 3:
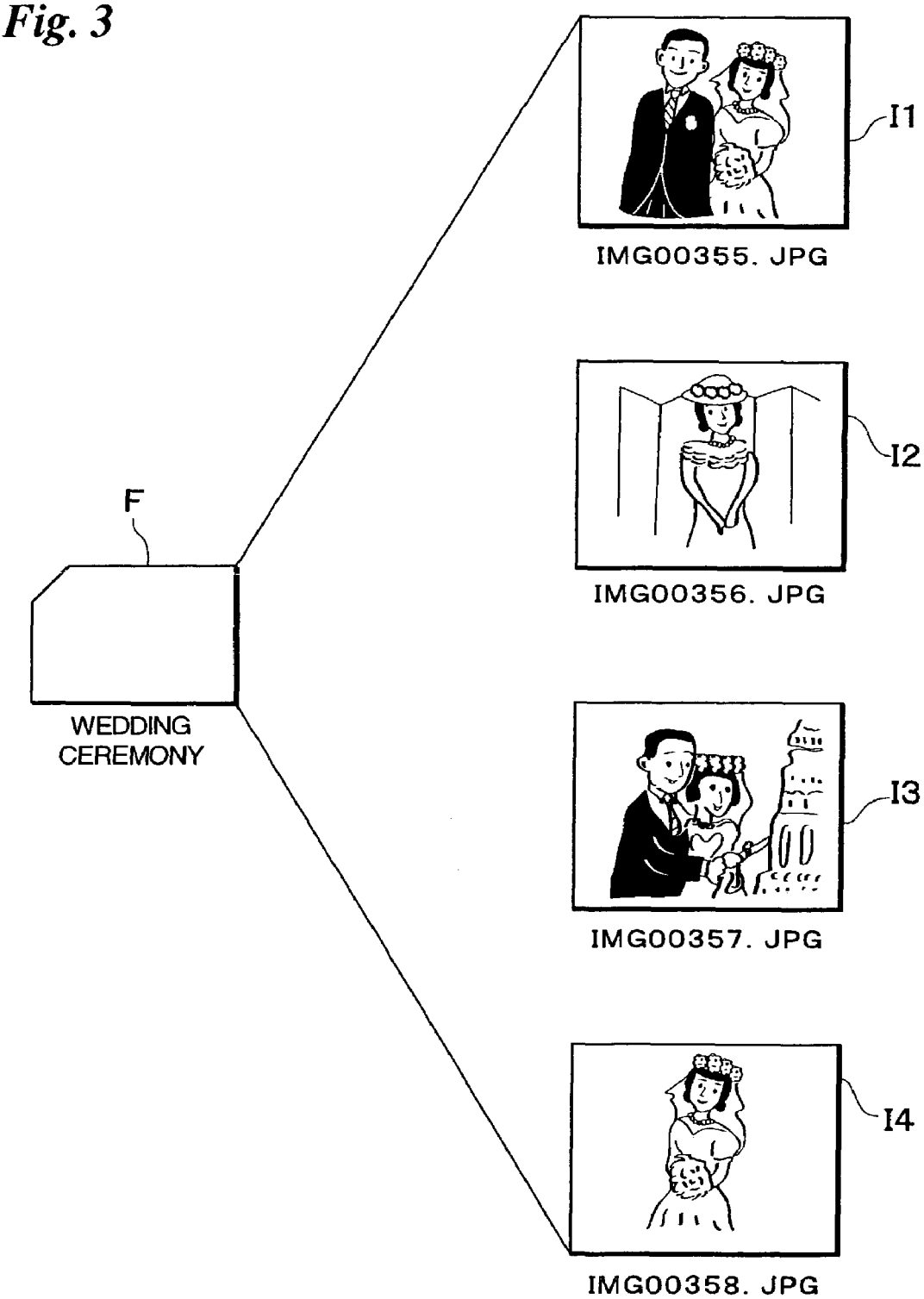
FIG. 3 illustrates still images represented by image files contained in a folder.

FIG. 3 illustrates images represented by image files that have been stored in a folder.

As mentioned above, the folder (folder icon) F having the folder name "WEDDING CEREMONY" contains still-image files having the file names from IMG00355.JPG to IMG00358.JPG. Still images (original images) I1 to I4 represented by the still-image files having the file names from IMG00355.JPG to IMG00358.JPG. are displayed.

Figure 4:
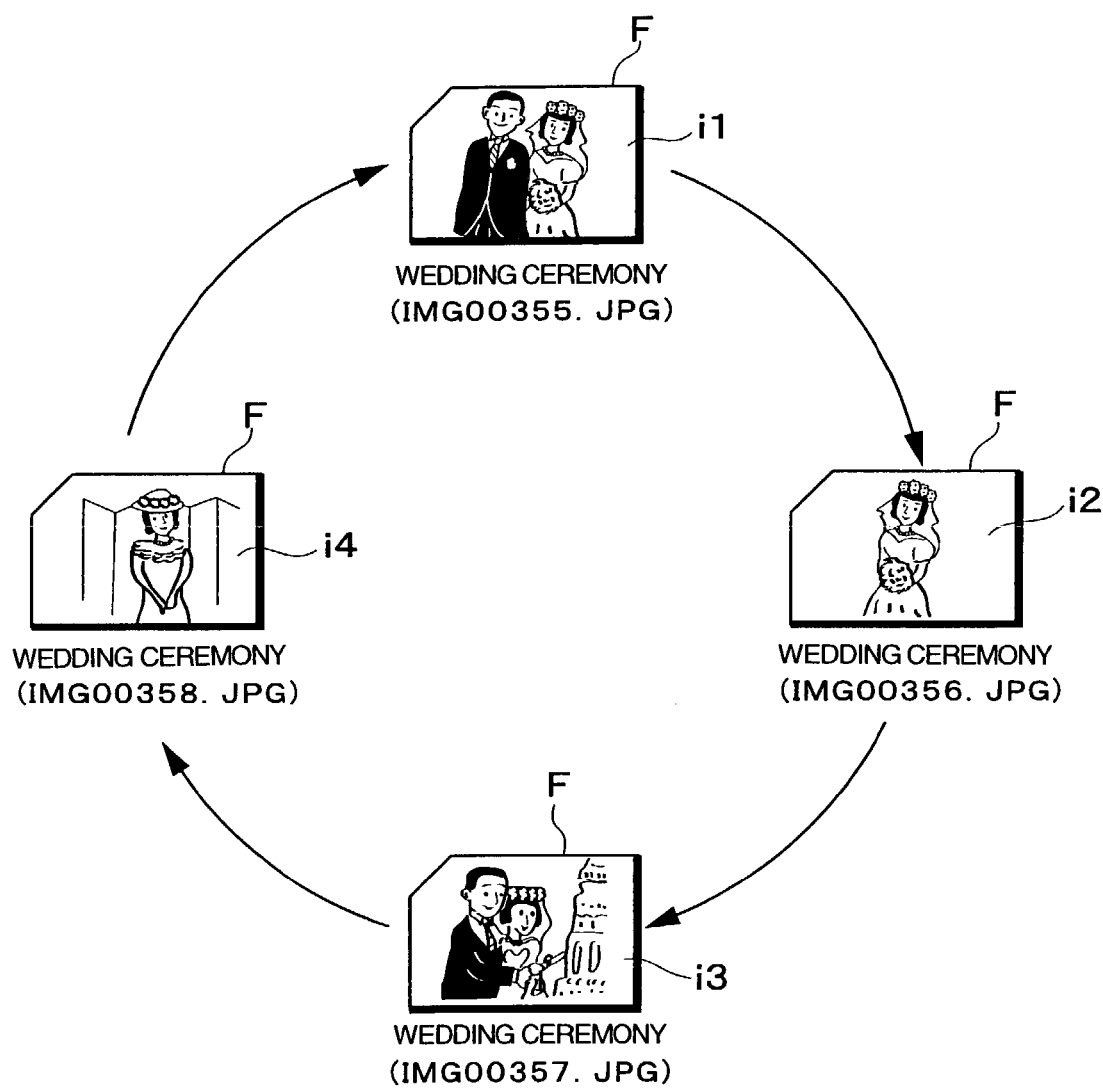
FIG. 4 illustrates the manner in which a slide show is presented.

FIG. 4 shows the manner in which images displayed on a folder icon are presented as a slide show.

In this embodiment, a plurality of frames of folder icon images corresponding to the size of a folder icon are generated from a plurality of frames of images represented by a plurality of image files contained in the folder. The generated folder icon images are displayed on the folder icon F in a fixed cycle in the order of the dates and times of photography of the corresponding images.

In the case of the folder icon F that specifies the folder having the folder name "WEDDING CEREMONY", first a folder icon image i1 (a thumbnail image of the still image I1) corresponding to the still image I1 having the date and time of photography that is earliest among the still-image files contained in the folder having the folder name "WEDDING CEREMONY" is displayed on the folder icon F. Upon passage of a fixed period of time, a folder icon image i2 corresponding to the still image I2 having the next date and time of photography is displayed on the folder icon F. Upon passage of the fixed periods of time again and again, a folder icon image i3 corresponding to the still image I3 is displayed on the folder icon F and then a folder icon image i4 corresponding to the still image I4 is displayed on the folder icon F. Thus, folder icon images i1 to i4 are successively displayed on the folder icon F in order, i.e., in the form of a slide show. It goes without saying that the folder icon images are generated by the computer 3 by means of downsampling processing or the like.

Figure 5:
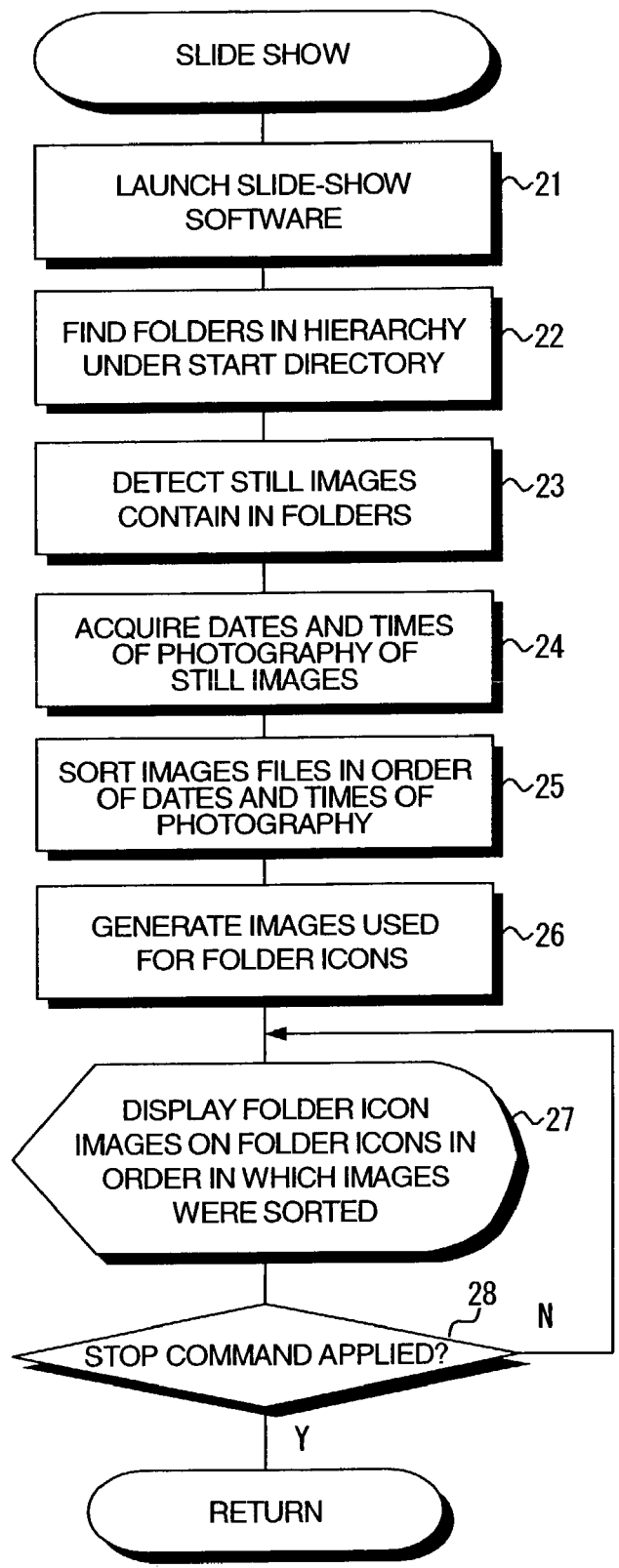
FIG. 5 is a flowchart illustrating processing for providing a slide show according to an embodiment of the invention.
Figure 6:
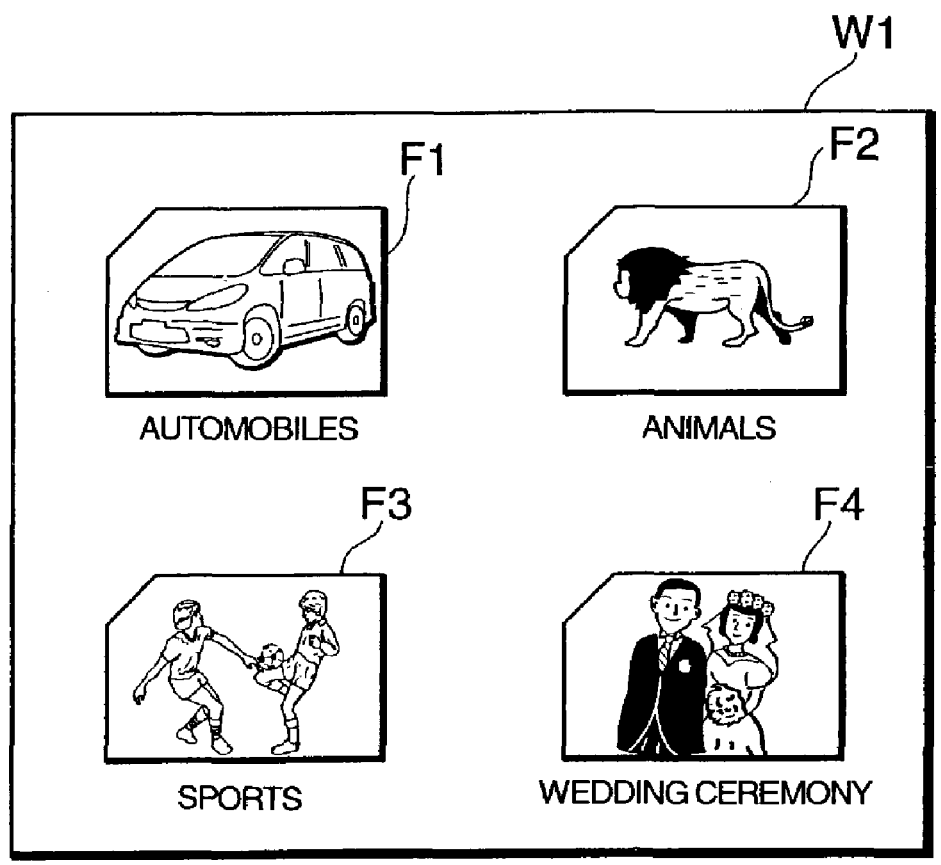
FIG. 6 shows an example of a window displayed on the display screen of a display unit according to the embodiment.

FIG. 5 is a flowchart illustrating processing for providing a slide show, and FIG. 6 shows an example of a window W1 displayed on the display screen of the display unit 1.

As mentioned above, the CD-ROM 11 on which a slide-show operating program has been stored is loaded in the CD-ROM drive 8 and the operating program is installed in the computer system. A command for launching slide-show software is applied by the user to launch the slide-show software (step 21).

Next, folders in the hierarchy under the directory to be started are found (step 22). For example, if the directory to be started is "DESKTOP" shown in FIG. 2, then folders having the folder names "AUTOMOBILES", "ANIMALS", "SPORTS" and "WEDDING CEREMONY" under this directory are found. The processing described below is executed with regard to all of the folders found.

Next, still-image files contained in each of the folders are found by a search applied to all folders that have been stored on the hard disk 10 (step 23). Data representing dates and times of photography stored in the still-image files is found by a search (step 24). The image files are sorted folder by folder in the order of the dates and times of photography found (step 25). Next, image data representing folder icon images is generated from the still-image files found in the manner set forth above (step 26).

When this is done, the window W1 shown in FIG. 6 appears on the display screen of the display unit 1. Folder icons F1, F2, F3 and F4 are displayed in the window W1. The folder icon images represented by the generated folder icon image data are displayed on the folder icons F1, F2, F3 and F4. More specifically, a slide show is presented on the folder icon F1 using the folder icon images generated from the still-image files contained in the folder, which is specified by the folder icon F1. Similarly, the folder icon images generated from the still-image files contained in the folders specified by respective ones of the folder icons F2, F3 and F4 are displayed on the folder icons F2, F3 and F4, respectively (step 27).

The slide show of the folder icon images is repeated until a stop command is entered by the user (step 28).

In the above embodiment, the folder icons are displayed in the window W1. However, an arrangement in which the folder icons are merely displayed on the display screen of the display unit 1 may be adopted.

Figure 7:
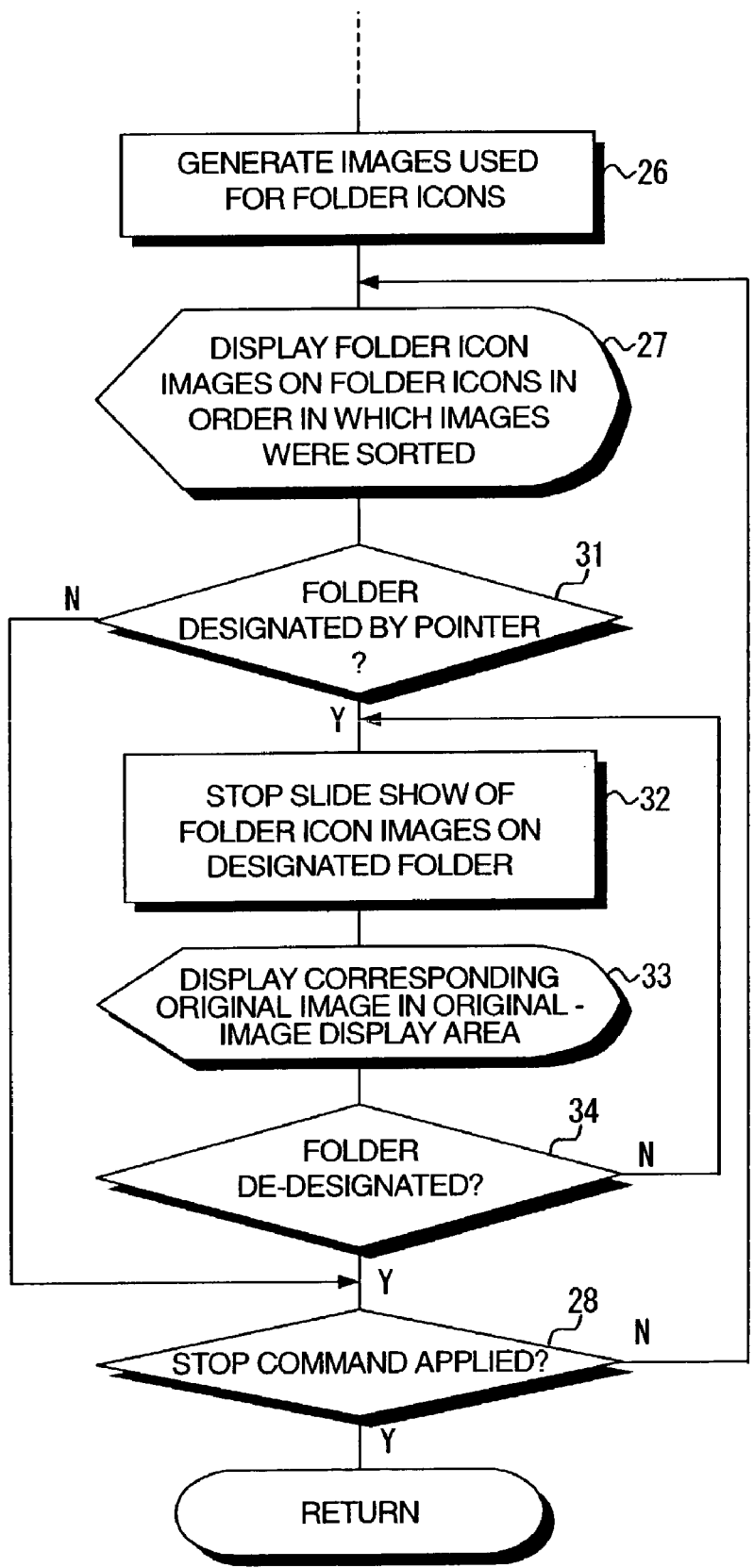
FIG. 7 is a flowchart illustrating part of the processing for providing a slide show according to a modification of the embodiment.
Figure 8:
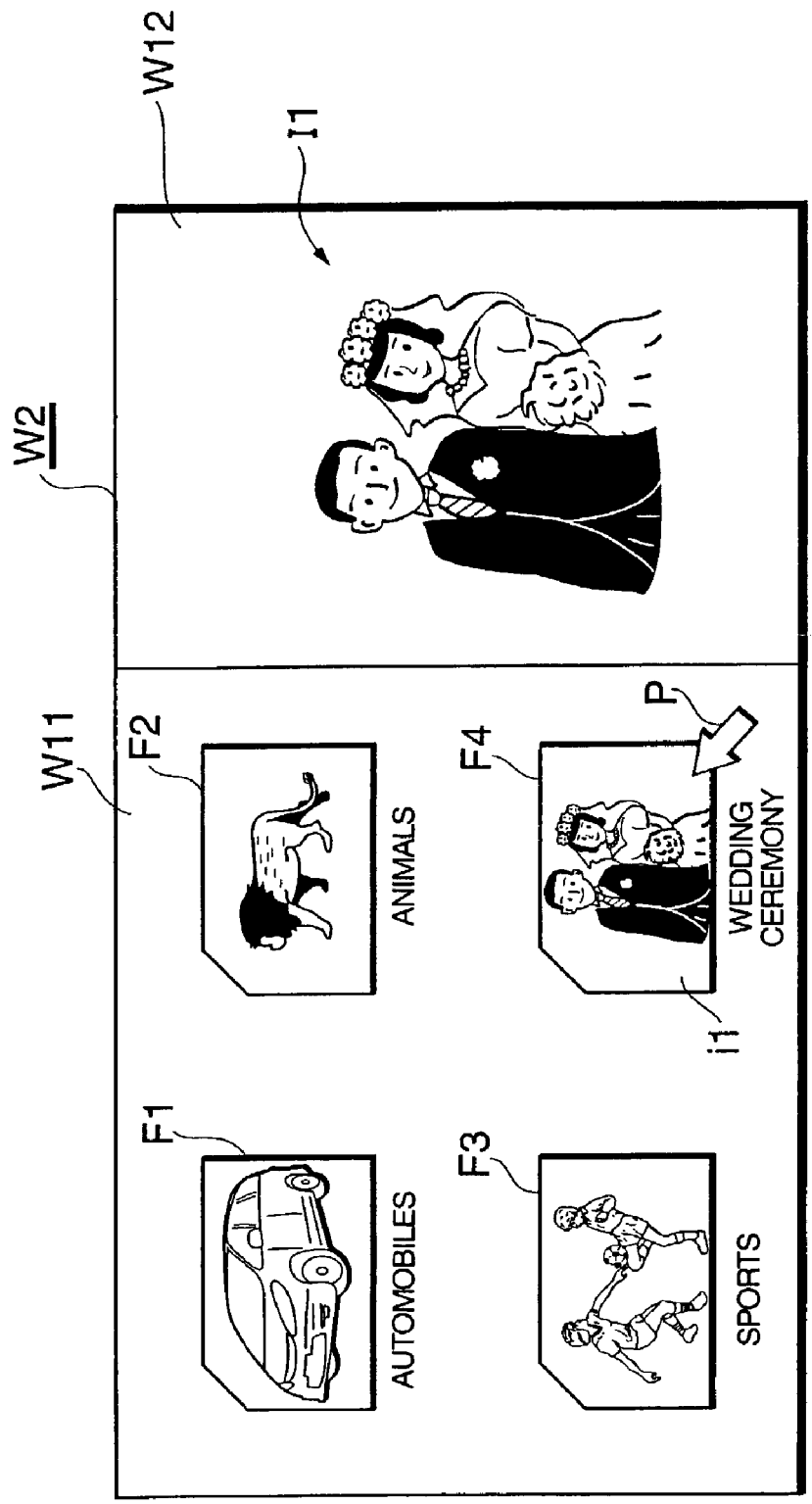
FIG. 8 shows an example of a window displayed on the display screen of the display unit according to the modification.

FIGS. 7 and 8 illustrate a modification of the above embodiment, in which FIG. 7 is a flowchart illustrating part of the processing for providing a slide show. Processing steps in FIG. 7 identical with those of the processing of FIG. 5 are designated by like step numbers and need not be described again. FIG. 8 shows an example of a window displayed on the display screen of the display unit 1.

As shown in FIG. 8, this modification includes small windows W11 and W12 in a window W2. The small window W11 is a window for displaying folder icons in the manner described above, and the small window W12 is a window for displaying an original still image that was used to generate one of the folder icon images. Since the original still image is displayed, the details of the image can be ascertained.

A slide show using the folder icon images is presented on the folder icons F1, F2, F3 and F4 being displayed, in the window W11 as described above (step 27).

Any one of the folder icons among the folder icons F1, F2, F3 and F4 is designated by a pointer P (step 31). The pointer P would be manipulated by the user employing the mouse 6. The slide show of icon images being presented on the folder icon designated by the pointer P (it is assumed here that folder icon F4 has been designated) is halted (step 32).

Image data representing the still image that corresponds to the folder icon image being displayed on the folder icon F4 at the moment it is designated by the pointer P (the folder icon image is assumed to be folder icon image i1) is read out of the hark disk 10. The still image I1 represented by the image data read out is displayed in the small window W12 (step 33).

If the pointer P is removed from the folder icon F4, then the folder icon F4 is de-designated ("YES" at step 34) and the slide show of folder icon images on the folder icon F4 starts again. The still image displayed previously may continue to be displayed in the small window W12 or may be made to vanish.

The above-described embodiment is such that when the pointer P is brought near a folder icon (e.g., placed on a folder icon), the corresponding still image is displayed in the small window W12. However, it may be so arranged that when the pointer P is placed on a folder icon and the folder icon is clicked by the mouse 6, the corresponding still image is displayed in the small window W12.

Figure 9:
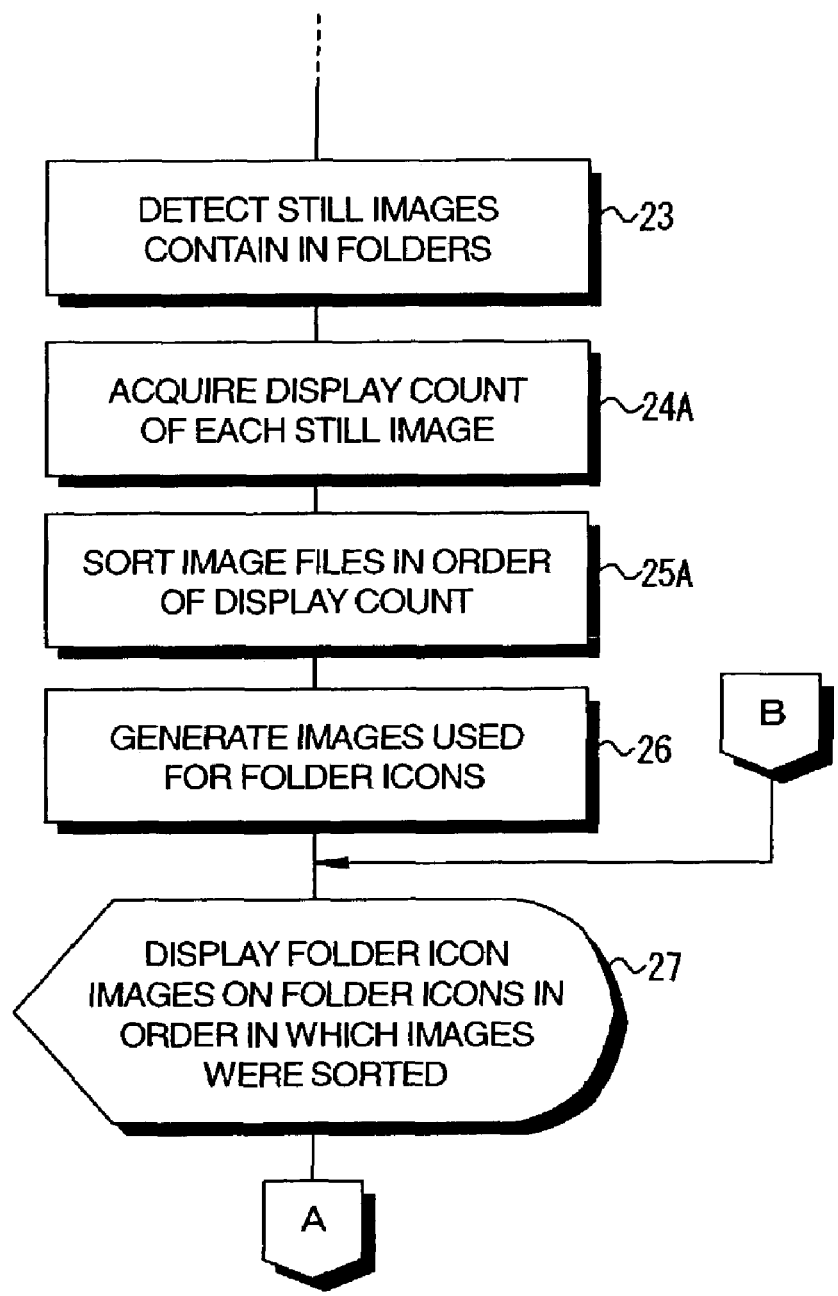
FIGS. 9 and 10 are flowcharts illustrating part of the processing for providing a slide show according to another modification of the embodiment.
Figure 10:
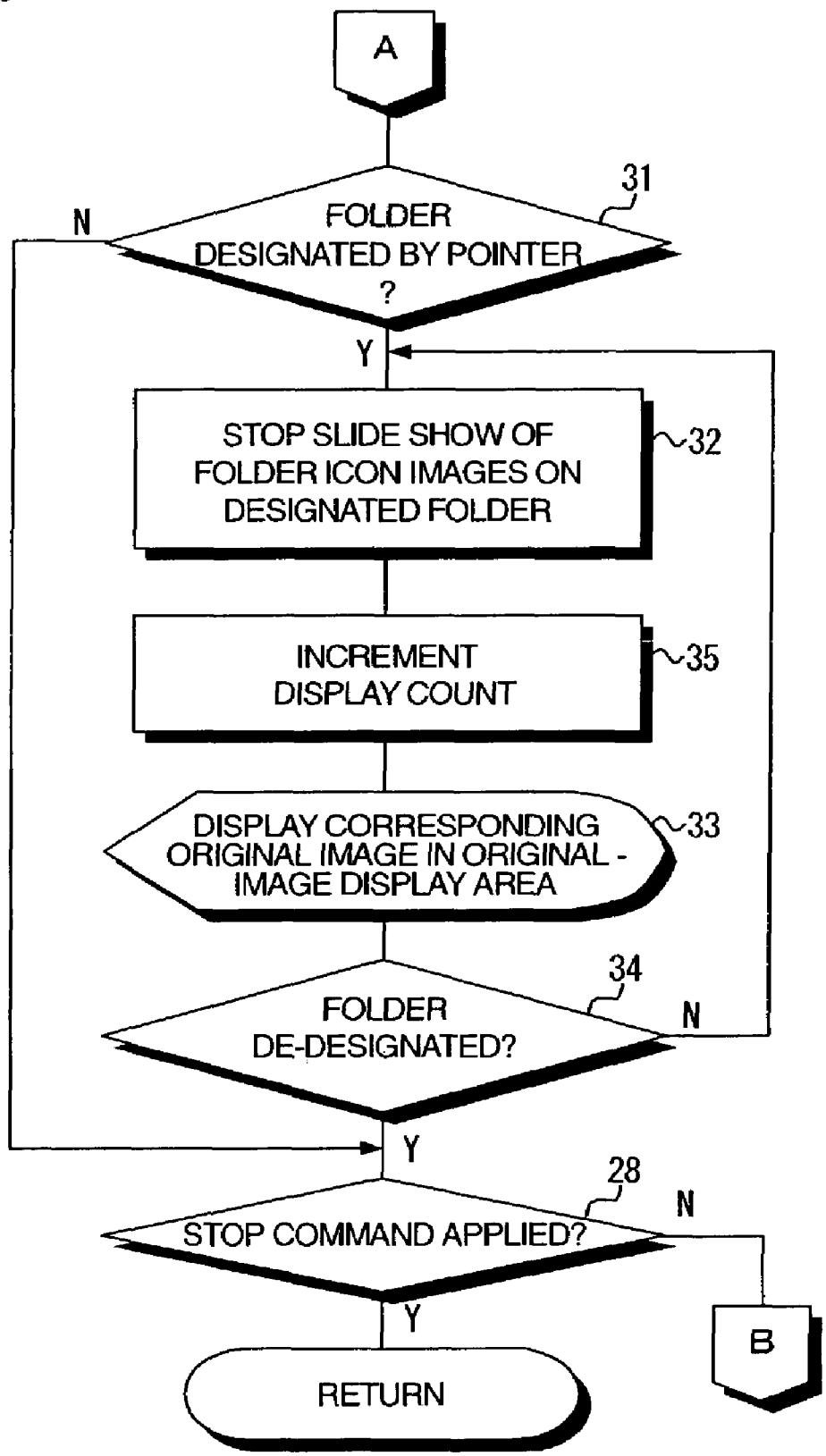

FIGS. 9 to 11 illustrate another modification. FIGS. 9 and 10 illustrate parts of a flowchart showing processing for providing a slide show. Processing steps identical with those of the processing of FIG. 5 or 7 are designated by like step numbers and need not be described again. FIG. 11 shows an example of a window W3 displayed on the display screen of display unit 1.

In the above embodiment, the slide show is presented in order of the date and time of photography. In the modification described next, the slide show is presented in order of the number of times still images have been displayed. A folder icon is designated by the pointer P in the manner described above and the number of times each still image has been displayed in the small window W12 is counted. The counting is performed by the computer 3 and the data representing the value of each count is stored on the hark disk 10 as a table corresponding to the file images.

The data representing the display count that has been stored in a prescribed area of the hard disk 10 is found (step 24A), whereupon the image files are sorted in order of decreasing (or increasing) display count (step 25A). As a result, the folder icon images are displayed on the folder icon in a slide show in order of decreasing (or increasing) display count (step 27).

When a folder icon is designated by the pointer P in the manner described above ("YES" at step 31), the slide show of the designated folder icon is halted (step 32). The display count of the still image corresponding to the folder icon image being displayed on the designated folder icon is incremented (step 35). The display count is displayed in the small window W12 together with the still image I1 corresponding to the designated folder icon image. The display count can be ascertained at a glance. Of course, the display count need not necessarily be displayed. It goes without saying that the table of display counts is updated in conformity with incrementing of the display count.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for controlling display of folder icons, comprising:
    an icon image data generating device for generating, for each of one or more folders, a plurality of frames of icon images from a plurality of frames of original images represented by a plurality of image files that are contained in each folder, each of said plurality of frames of icon images corresponding to a respective one of the plurality of frames of original images and having such a size that each of the icon images can be displayed on a folder icon corresponding to said each folder; and
    a display control device for controlling a display device in such a manner that, in response to an icon-image display command corresponding to any one folder, each of the plurality of frames of icon images corresponding to the any one folder and generated by said icon image data generating device will be individually displayed in order on the folder icon of the any one folder in the form of a slide show.

2. The apparatus according to claim 1, further comprising:
    a command device for applying an original-image display command, wherein
    the display control device further controls the display device so as to display the original image corresponding to the icon image currently being displayed on the folder icon of the any one folder, when an original-image display command has been applied by said command device.

3. The apparatus according to claim 2, further comprising:
    a counting device for counting number of times the original image is displayed, wherein
    said display control device decides the order of display of the icon images based upon a count obtained from said counting device.

4. An apparatus for controlling display of folder icons, comprising:
    an icon image data generating device for generating, for each of a plurality of folders, a plurality of frames of icon images from a plurality of frames of original images represented by a plurality of image files that are contained in each folder, each of said plurality of frames of icon images corresponding to a respective one of the plurality of frames of original images and having such a size that each of the icon images can be displayed on a folder icon corresponding to said each of the plurality of folders; and
    a display control device for controlling a display device in such a manner that each of the plurality of frames of icon images corresponding to said each of the plurality of folder and generated by said icon image data generating device will be individually displayed in order on the corresponding folder icon in the form of a slide show, wherein
    for all folder icons that are simultaneously displayed on the display device and that contain a plurality of image files, the display control device controls the display device to simultaneously display the respective slide shows on the corresponding folder icon.

* * * * *